United States Patent [19]

Clarke et al.

[11] Patent Number: 5,271,229
[45] Date of Patent: Dec. 21, 1993

[54] METHOD AND APPARATUS TO IMPROVE A TURBOCHARGED ENGINE TRANSIENT RESPONSE

[75] Inventors: John M. Clarke, Chillicothe; James J. Faletti, Spring Valley, both of Ill.

[73] Assignee: Caterpillar Inc., Peoria, Ill.

[21] Appl. No.: 891,883

[22] Filed: Jun. 1, 1992

[51] Int. Cl.⁵ ............................................. F02B 37/00
[52] U.S. Cl. ................................. 60/605.1; 123/90.11; 123/321
[58] Field of Search ............. 60/605.1, 606, 602; 123/90.11, 198 F, 321

[56] References Cited

U.S. PATENT DOCUMENTS

| | | | |
|---|---|---|---|
| 3,220,392 | 11/1965 | Cummins | 123/321 |
| 4,202,300 | 5/1980 | Skay | |
| 4,248,198 | 2/1981 | Deutschmann et al. | 123/559.1 |
| 4,250,850 | 2/1981 | Ruyer | 123/198 F |
| 4,359,979 | 11/1982 | Dolza | 123/198 F |
| 4,429,532 | 2/1984 | Jakuba | 60/605.1 X |
| 4,455,984 | 6/1984 | Merlini et al. | 123/481 |
| 4,550,568 | 11/1985 | Deutschmann et al. | 60/612 |
| 4,565,167 | 1/1986 | Bryant | 123/70 R |
| 4,572,148 | 2/1986 | Deutschmann et al. | |
| 4,593,658 | 6/1986 | Moloney | 123/90.11 |
| 4,671,226 | 6/1987 | Van Rinsum | 123/179 F |
| 5,117,790 | 6/1992 | Clarke et al. | 123/321 |
| 5,165,653 | 11/1992 | Weber | 251/57 |

FOREIGN PATENT DOCUMENTS

| | | |
|---|---|---|
| 131919 | 6/1987 | Japan . |
| 2071210 | 9/1981 | United Kingdom . |

*Primary Examiner*—Michael Koczo
*Attorney, Agent, or Firm*—Kenneth A. Rhoads

[57] ABSTRACT

During low speed operation of a turbocharged engine the transient response time of the engine from low speed and low loads to high speed and high loads is slow because of the slow response time to raise the boost pressure level from the turbocharger. The present invention provides an apparatus to improve the transient response time of the engine by causing at least a selected subset of the combustion chambers to be operated in a two-stroke pumping mode of operation while maintaining the others in a four-stroke mode, thus, increasing the airflow through the turbine of the turbocharger during low speed and/or low loads operation of the engine maintaining a high boost pressure level.

12 Claims, 3 Drawing Sheets

METHOD AND APPARATUS TO IMPROVE A TURBOCHARGED ENGINE TRANSIENT RESPONSE

DESCRIPTION

1. Technical Field

The present invention relates generally to the controlled operation of engine operation cycles, and more particularly, the invention relates to a preestablished logic pattern and the modifying of the preestablished logic pattern to sequentially, and modulateably controlling valve timing to improve the transient response time from low speed and/or low loads to high speed and/or high loads and to reduce particulates.

2. Background Art

During low speed operation of a turbocharged engine there is more than sufficient air for combustion, however, the transient response time of the engine from low speed and low loads to high speed and high loads is slow because of the time needed to raise the boost pressure level from the turbocharger. Exhaust gas drives a turbine of the turbocharger which, in turn, drives a compressor of the turbocharger providing supercharged air to the combustion chambers of the engine. During low speed operation the exhaust gas flow caused by the low rate of engine displacement fails to generate a substantial pressure drop across the turbine. As a result, the turbine is being driven at a relative slow speed and the boost pressure level attained by the turbocharger is low. By the injection of additional fuel in the combustion chambers the speed of the engine is increased which, in turn, creates more exhaust gas flow to drive the turbine faster which, in turn, increases the boost pressure level. However, there is an undesirable time lag until the turbine can be brought up to full speed and the boost pressure level increased to obtain full power from the engine. Also, during this relatively long transient time period there is an insufficient amount of air for clean combustion of the amount of fuel injected creating black smoke.

To improve the transient response time heretofore, engines employed multiple turbochargers or adjustable output turbochargers. The result being increased customer cost and a greater possibility of hardware failure due to an increased number of components and complexity.

Thus, what is needed is an apparatus to improve the transient response time of the engine from low speed and/or low loads to high speed and/or high loads by increasing the airflow through the turbine of the turbocharger during low speed and/or low loads operation of the engine maintaining a high boost pressure level.

The present invention is directed to overcome one or more of the problems as set forth above.

DISCLOSURE OF THE INVENTION

In one aspect of the invention, an apparatus is adapted for use with a turbocharged engine to improve the transient response time from low speed and low loads to high speed and high loads. The engine includes a plurality of combustion chambers, an intake port and an exhaust port for each combustion chamber. A turbocharger having a compressor, a turbine and an established boost pressure level is operatively connected to the intake port and the exhaust port. A piston is reciprocally movable in each of the combustion chambers for performing an intake stroke, a compression stroke, an expansion stroke, and an exhaust stroke. The apparatus includes flow control means including intake means for selectively permitting flow into each of the combustion chambers, and exhaust means for selectively permitting flow away from each of the combustion chambers. The apparatus further includes means for actuating each of the intake means and the exhaust means independently in response to a control signal and electronic control means responsive to sensed operating parameters. The electronic control means causes the intake means of a selected subset of the combustion chambers to be initiated during every intake and expansion stroke permitting the flow of air into the combustion chambers and the exhaust means of the selected subset of the combustion chambers to be initiated during every compression and exhaust stroke, pumping the air from the combustion chambers increasing the air flow through the turbine and raising the boost pressure level.

In another aspect of the invention, a method of operating an engine having a plurality of combustion chambers, an intake port and an exhaust port for each of the combustion chambers, a turbocharger having a compressor, a turbine, and an established boost pressure level, and a piston reciprocally movable in each of the combustion chambers is comprised of the following steps: monitoring the operating condition of the engine, outputting a control signal to an intake means and an exhaust means, actuating each of the intake means and the exhaust means independently in response to a control signal, actuating the intake means of a selected subset of the combustion chambers during every intake and expansion stroke permitting the flow of air into the combustion chambers, and actuating the exhaust means of the selected subset of the combustion chambers during every compression and exhaust stroke increasing the air flow through the turbine and raising the boost pressure level.

BEST MODE FOR CARRYING OUT THE INVENTION

Figure 1:
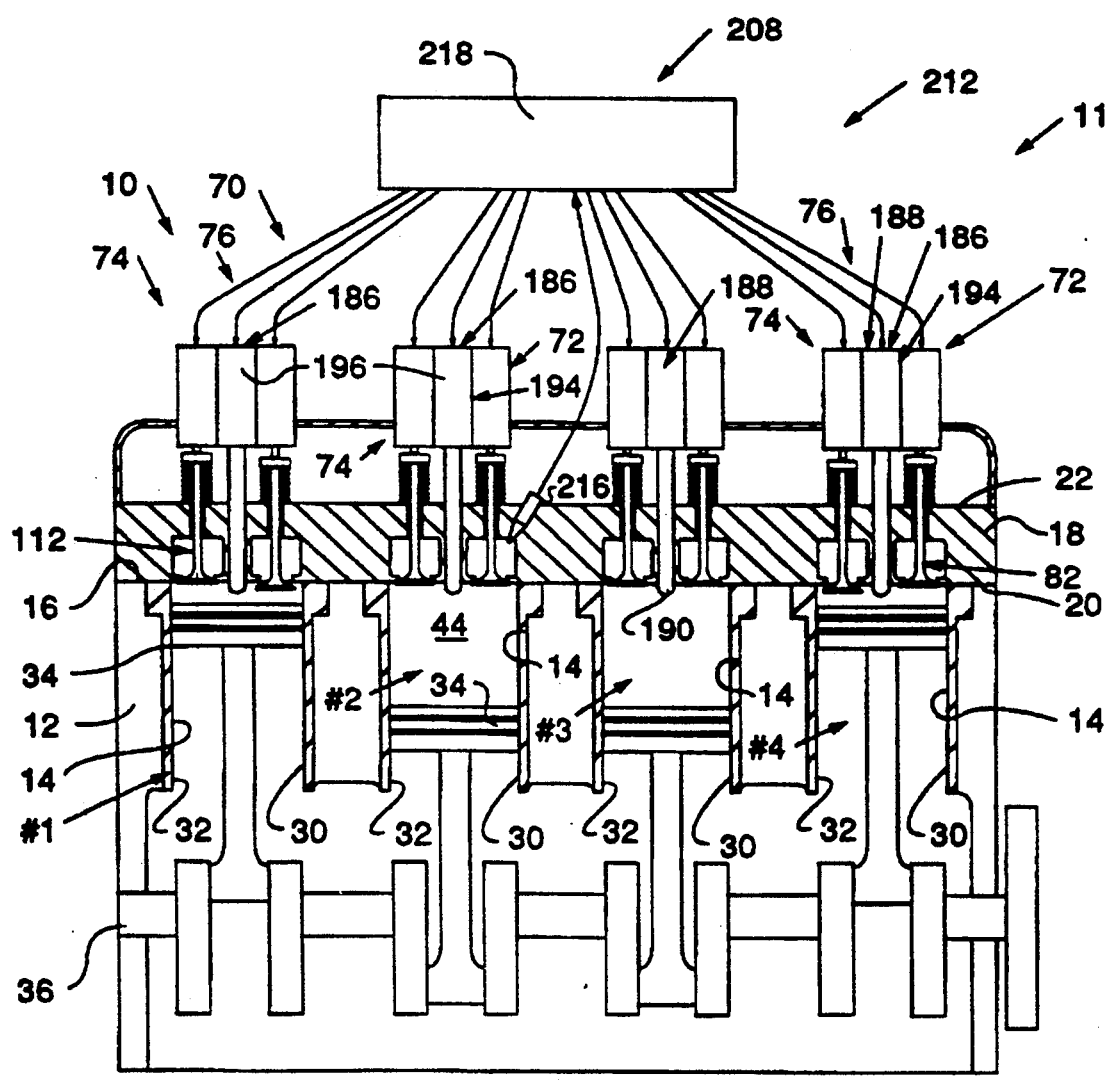
FIG. 1 is a diagrammatic side partially sectional view of an engine having an embodiment of the present invention.
Figure 2:
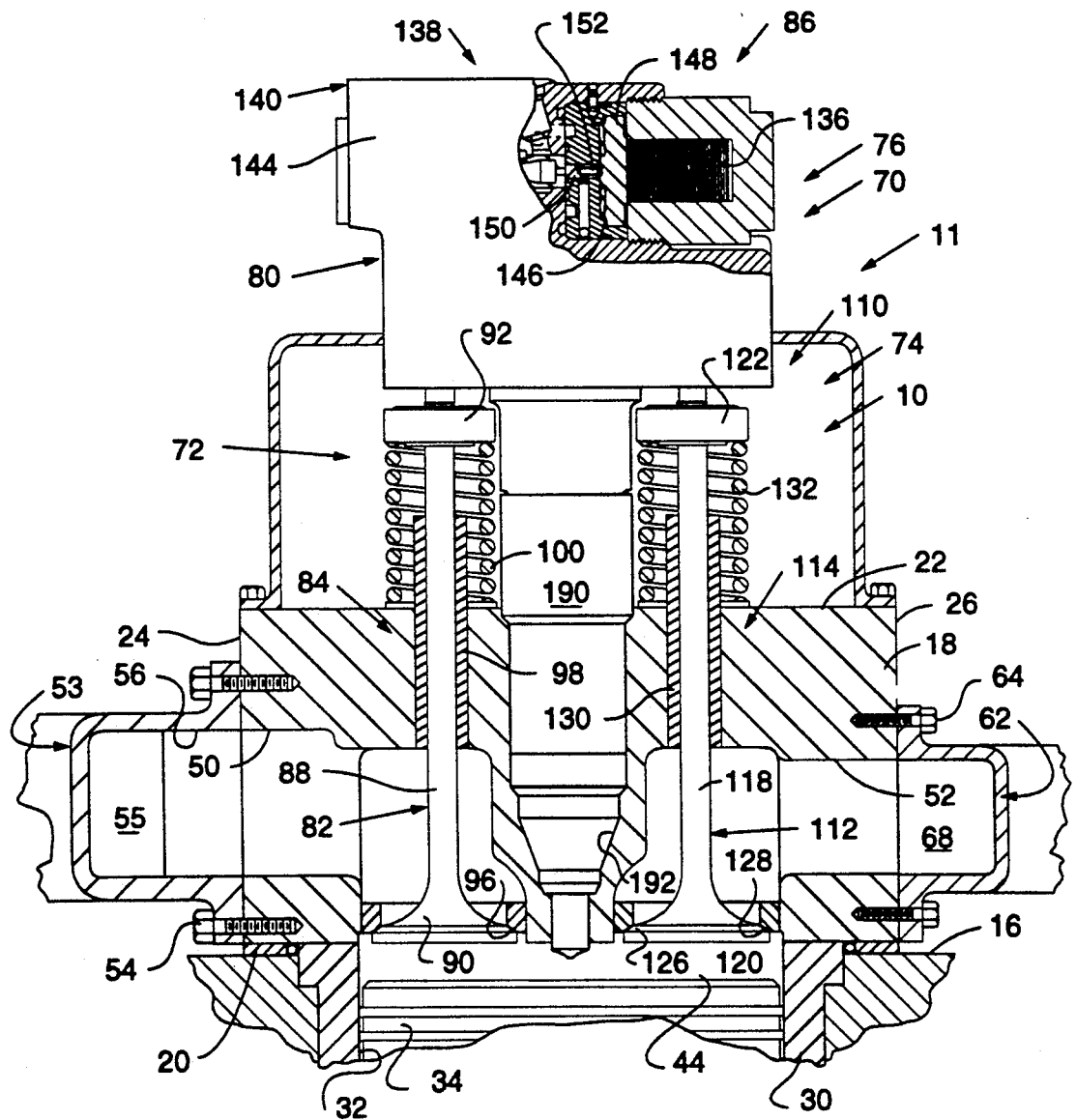
FIG. 2 is a cross-sectional view of a portion the engine of FIG. 1.
Figure 3:
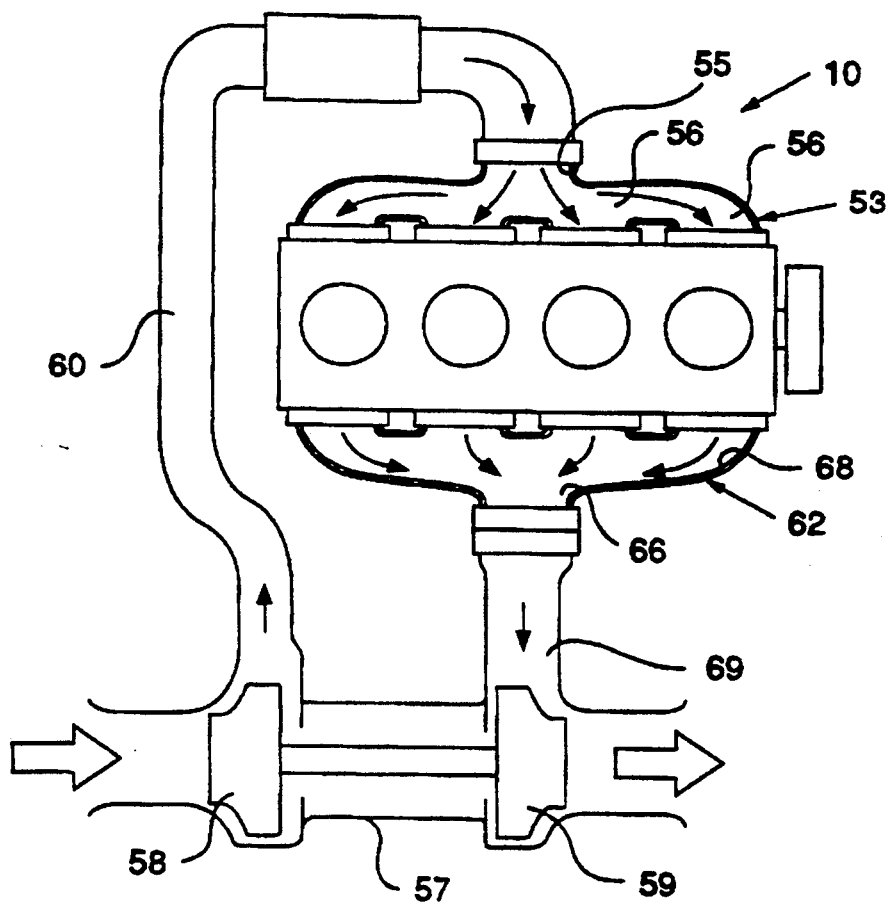
FIG. 3 is a diagrammatic plan partial section view of the engine of FIG. 1.

Referring to FIGS. 1, 2, and 3 an inline type, four cylinder, compression ignition, internal combustion, turbocharged engine 10 is schematically illustrated. The engine 10 includes an apparatus 11 to reduce the transient response time of the engine from low speed and low loads to high speed and high loads. The engine 10, in this specific instance, operates in a conventional four-stroke mode having sequential intake, compression, expansion, and exhaust strokes. Although the present invention will be described and disclosed with respect to an inline type four cylinder engine 10, it is recognized that the system could equally be used on for example, a turbocharged, multi-cylinder, vee type engine having different operating modes.

The engine 10 includes a block 12 defining a plurality of cylinder bores 14 and a top block mounting surface 16. The engine 10 further includes a cylinder head 18 having a bottom head mounting surface 20, a top head surface 22, a first head side mounting surface 24, and a second head side mounting surface 26. The bottom head mounting surface 20 is seated on the top block mounting surface 16 and rigidly attached thereto in the usual way by a plurality of fasteners, not shown. Alternatively, the block 12 and the cylinder head 18 could be of an integral design.

In this application, a replaceable cylinder liner 30 having a piston liner bore 32 is positioned within each of the cylinder bores 14. The liner bores 32 define a plurality of cylinders #1, #2, #3, and #4. Each piston bore 32 has a piston 34 slidably disposed therein for driving a crankshaft 36 in a conventional manner. The crankshaft 36 is rotatively supported in the block 12. The pistons 34 reciprocally move in their respective liner bores 32 between a top dead center (TDC) position and a bottom dead center (BDC) position. A combustion chamber 44 is formed by the cylinder head 18, the liner bore 32, and the piston 34.

As representatively illustrated in FIG. 2, the cylinder head 18 defines for each of the combustion chambers 44 of the cylinders #1, #2, #3, and #4, an intake port 50 and an exhaust port 52. Each of the intake ports 50 extend from the first head side mounting surface 24 to the bottom head mounting surface 20. Each of the exhaust ports 52 extend from the second head side mounting surface 26 to the bottom head mounting surface 20.

The engine 10 in this specific instance is operable in the four-stroke mode. The four stroke mode defines a first predetermined logic pattern in which the pistons 34 are reciprocally movable in each of the combustion chambers 44 between the top dead center position and the bottom dead center position forming an intake stroke during which air is introduced from the intake port 50 into the combustion chamber 44. The pistons 34 are further movable between the bottom dead center position and the top dead center position forming a compression stroke during which the air in the combustion chamber 44 is compressed to an established temperature range and fuel is introduced at or before top dead center during which a desired ignition delay period occurs prior to combustion of the mixture of fuel and air in the combustion chambers 44. Combustion of the fuel and air mixture occurs near top dead center movement of the pistons 34. As a result of combustion, the pistons 34 are driven in the combustion chambers 44 between the top dead center position and a bottom dead center position by the expanding exhaust gas forming an expansion stroke. The pistons 34 are movable between the bottom dead center position and the top dead center position forming an exhaust stroke during which exhaust gas is expelled from the combustion chamber 44 into the exhaust port 52.

As best shown in FIGS. 2 and 3, an intake manifold 53 is rigidly attached to the first head side surface 24 in the usual way by a plurality of fasteners 54. The intake manifold 53 defines an intake manifold passage 55 and a plurality of interconnected intake manifold branch passages 56. The intake manifold branch passages 56 are in fluid communication with the intake ports 50 in a conventional manner.

The engine 10 further includes a turbocharger 57 having an incoming air compressor 58 and an exhaust gas driven turbine 59. The compressor 58 is operatively connected to the intake manifold passage 55 by an intake conduit 60 in the conventional manner providing supercharged air to the combustion chambers 44.

An exhaust manifold 62 is attached to the second head mounting surface 26 in the usual way by a plurality of fasteners 64. The exhaust manifold 62 defines an exhaust manifold passage 66 and a plurality of interconnected exhaust manifold branch passages 68. The exhaust manifold branch passages 68 are in fluid communication with the exhaust ports 52 in a conventional manner.

The exhaust gas driven turbine 59 of the turbocharger 57 is operatively connected to the exhaust manifold passage 66 by an exhaust gas conduit 69. Exhaust gas from the combustion chambers 44 drives the turbine 59 which, in turn, drives the compressor 58 in a conventional manner.

The engine 10 further includes flow control means 70 for selectively communicating the intake manifold 54 and the exhaust manifold 62 with the combustion chambers 44. The flow control means 70 includes for each of the combustion chambers 44, intake means 72, exhaust means 74, and means 76 for actuating each of the intake means and the exhaust means independently in response to a control signal.

The intake means 72 includes, in this specific instance, an intake valve 82 operatively mounted in each one of the intake ports 50 and intake valve support means 84 for reciprocally supporting the intake valve 82 in the cylinder head 18. It is recognized that the intake means 72 could include multiple intake valves 82 and intake valve support means 84.

The intake valve 82 includes an intake valve stem 88, an intake valve head portion 90 disposed at one end of the intake valve stem and an enlarged intake valve retainer 92 disposed at an opposite end. The intake valve head portion 90 defines an annular intake valve sealing surface 94 of a dimension sufficient for sealingly seating on an annular intake port seating face 96 about the intake port 50.

The intake valve support means 84 includes an intake valve guide 98. The intake valve guide 98 is mounted in the cylinder head 18 and encompasses the intake valve stem 88. An intake valve spring 100 is disposed about the intake valve stem 88 and extends between the top head surface 22 and the intake valve retainer 92. The intake valve spring 100 urges the intake valve sealing surface 94 against the intake port seating face 96 until the intake valve seating surface is moved away from the intake port seating face.

Referring to FIGS. 1 and 2, the exhaust means 74 includes, in this specific instance, an exhaust valve 112 operatively mounted in each one of the exhaust ports 52, and an exhaust valve support means 114 for reciprocally supporting the exhaust valve 112 in the cylinder head 18. It is recognized that the exhaust means could include multiple exhaust valves 112 and exhaust valve support means 154.

The exhaust valve 112 includes an exhaust valve stem 118, an exhaust valve head portion 120 disposed at one end of the exhaust valve stem, and an exhaust valve retainer 122 disposed at an opposite end. The exhaust valve head portion 120 defines an annular exhaust valve sealing surface 126 of a dimension sufficient for sealingly seating on an annular exhaust port seating face 128 defined about the exhaust port 52.

The exhaust valve support means 114 includes an exhaust valve guide 130. The exhaust valve guide 130 is mounted in the cylinder head 18 and encompasses the exhaust valve stem 118. An exhaust valve spring 132 is disposed about the exhaust valve stem 118 and extends between the top head surface 22 and the exhaust valve retainer 122. The exhaust valve spring 132 urges the exhaust valve sealing surface 126 against the exhaust port seating face 168 until the exhaust valve seating surface is moved away from the exhaust port seating face 128.

In the preferred embodiment, as best shown in FIG. 2, the means 76 for actuating each of the intake means 72 and exhaust means 74 includes a like number of piezoelectric motors 136, only one shown. It is recognized that in place of the piezoelectric motors 136, solenoids, voice coils, or linear displaceable electromagnetic assemblies could be used. Each piezoelectric motor 136 is housed in unit valve actuator means 138. The unit valve actuator means 138 includes a valve actuator assembly 140 operatively engaged with the respective intake and exhaust valves 82 and 112 adjacent the respective intake and exhaust valve end retainers 92 and 122 for electronically manipulating the intake and exhaust valves. Operation of this device is well-known, see for example U.S. Pat. No. 5,165,653; however, its function will be briefly described here. The valve actuator assembly 140 includes, a valve actuator housing 144 having a stepped cavity 146 in which is positioned an actuator valve drive piston 148, an actuator valve amplifier piston 150, and an actuator valve fluid chamber 152 therebetween.

The piezoelectric motor 136, which is well-known in the art, expands linearly responsive to electrical excitation by a preestablished quantity of energy and contracts when the electrical excitation is ended. Variations in the amount of electrical excitation will cause the piezoelectric motor 136 to expand linearly dependent on the amount of electrical excitation. The piezoelectric motor 136 generates a high force in a linear direction, however, its linear expansion is less than what is required to displace the intake and exhaust valve sealing surfaces 94 and 126 away from the intake and exhaust port seating faces 96 and 128. Therefore, the actuator valve drive piston 148, actuator valve amplifier piston 150, and the actuator valve fluid chamber 152 are provided to translate and amplify linear displacement of the piezoelectric motor 136 in the following manner. The actuator valve amplifier piston 150 is sized much smaller than the actuator valve drive piston 148 because the hydraulic amplification ratio of the linear displacement of the actuator valve driver piston 148 as it relates to the linear displacement of the actuator valve amplifier piston 150 is inversely proportional to the surface area ratio of the actuator valve driver piston 148 to the actuator valve amplifier piston 150. Thus, small linear displacement of the piezoelectric motor 136 is amplified to produce significantly greater linear displacement of the actuator valve amplifier piston 150.

The engine 10 further includes fuel injector means 186 for each of the combustion chambers 44. The fuel injector means 186 includes an electronic controlled injector operating mechanism 188. As best shown in FIGS. 1 and 2, the electronic controlled injector operating mechanism 188 includes an electronically controlled unit fuel injector 190 of a conventional design disposed in a stepped injector bore 192 defined in the cylinder head 18 and the means 76 for electronically controlling each of the unit fuel injectors 190 independently. The means 76 is operatively engaged with each unit fuel injector 190. Because the means 76 for the unit fuel injector 190 is essentially the same design and functions in essentially the same manner as means 76 for the intake and exhaust means 72 and 74 they will not be described in detail. As an alternative, any conventional fuel system could be used.

As shown in FIG. 1, an electronic control system 208 is operatively connected to the actuating means 76 and adapted to direct appropriate control signals therefrom to the actuating means to functionally control the engine 10 in the first predetermined logic pattern for normal engine operation.

The apparatus 11 is adapted for use with a turbocharged engine 10 to improve transient response. The apparatus 11 includes an electronic control means 212 for causing the control signals to be outputted to the actuating means 76 in a second predetermined logic pattern different than the first predetermined logic pattern. The electronic control means 212 includes the electronic control system 208, the control signals, a plurality of sensors 216, one of which is shown, and a microprocessor 218. The sensors 216 relay information concerning the operating parameters of the engine 10, such as, boost pressure level, temperature, rpm's, loads, and air-fuel mixture, to the microprocessor 218.

In the second predetermined logic pattern the electronic control means 212 is responsive to the sensed operating parameters of the engine 10 causing a selected subset of the combustion chamber 44 to be operated in two-stroke pumping mode of operation while the others remain in the four-stroke mode of operation. It should be recognized that the selected subset could be a single combustion chamber 44 or conversely the selected subset could be two or more combustion chambers without departing from the essence of the invention. The fuel injector actuator assemblies 196 in the selected subset of the combustion chambers 44 are not actuated while operating in the two-stroke pumping mode.

The intake means 72 of the selected subset of combustion chambers 44 operating in the two-stroke pumping mode are initiated during every intake and expansion stroke and the exhaust means 74 of the selected subset of combustion chambers 44 are initiated during every compression and exhaust stroke.

Industrial Applicability

In use, the engine 10 utilizes the means 76 for unit actuating the intake and exhaust valve means 72 and 74. The microprocessor 218 uses a program logic to process the information provided by the sensors 216 and based upon the results of the analysis supplies an electrical current to selected ones of the piezoelectric motors 136 for actuation of the intake valve unit actuator means 86, the exhaust valve unit actuator means 156, and the fuel injector unit actuator means 194. The intake and exhaust valve operating means 72 and 74 and the fuel injector means 186 are actuated independently of each other and thus, the intake valves 82, the exhaust valves 152, and the fuel injectors 190 are all independently controlled so as to produce optimum timing events of valve opening and closing and fuel injection for various engine 10 operating conditions independent of crankshaft 36 rotational position.

The electronic control means 212 including the electronic control system 208, the control signals, the sensors 216, and the microprocessor 218 are operatively connected to the actuating means 76 to functionally control the engine 10 in first and second predetermined logic patterns. In the first predetermined logic pattern the engine 10 is operated in the normal four-stroke mode. In the second predetermined logic pattern the selected subset of one or more of the combustion chambers 44 are operated in a two-stroke pumping mode of operation while the others remain in the four-stroke mode of operation. When the engine 10 is operating at low speed and/or low loads, the boost pressure level from the turbocharger 57 can be increased by causing the selected subset of the combustion chambers 44 to be operated in two-stroke pumping mode of operation while the others remain in the four-stroke mode of operation. In the two-stroke pumping mode the selected subset of the combustion chambers 44 induces approximately twice as much airflow through the turbine 59 as in the four-stroke mode of operation.

The electronic control means 212 acts in response to sensed operating parameters of the engine 10 including the boost pressure level attained by the turbocharger 57 falling below the established boost pressure level which causes the control signals to be outputted to the actuating means 76 in the second predetermined logic pattern.

The intake means 72 of the selected subset of the combustion chambers 44 operating in the two-stroke pumping mode are initiated during every intake and expansion stroke permitting the flow of air into the selected subset combustion chambers 44 and the exhaust means 74 of the selected subset of the combustion chambers 44 are initiated during every compression and exhaust stroke. As a result, air is pumped from the selected subset of combustion chambers 44 by reciprocal movement of the piston 34 from the bottom dead center position to the top dead center position effectively maintaining the air flow through the turbine 59 and maintaining the boost pressure level. The maintained air flow sustains the pressure drop across the turbine, as a result the turbine is being driven at the same high speed as exists at high speed operation of the engine. This high speed, in turn, drives the compressor at a high speed to produce a compressed air pressure which establishes the boost pressure level. The raised boost pressure level and air flow is advantageous for clean combustion particularly during transient operation during which it becomes possible to burn more fuel and get faster response.

Other aspects, objects and advantages of this invention can be obtained from a study of the drawings, the disclosure and the appended claims.

We claim:

1. An apparatus adapted for use with a turbocharged engine to improve transient response, the engine including a plurality of combustion chambers, an intake port and an exhaust port for each combustion chamber, a turbocharger having a compressor operatively connected to the intake port, a turbine operatively connected to the exhaust port, and an established boost pressure range, and a piston being reciprocally movable in each of the combustion chambers between a top dead center position and a bottom dead center position forming an intake stroke, movable between the bottom dead center position and the top dead center position forming a compression stroke, movable between a top dead center position and a bottom dead center position forming an expansion stroke, and movable between the bottom dead center position and the top dead center position forming an exhaust stroke, the apparatus comprising:

flow control means including intake means for selectively permitting flow into each of the combustion chambers, and exhaust means for selectively permitting flow away from each of the combustion chambers;

means for actuating each of the intake means and the exhaust means independently in response to a control signal; and electronic control means responsive to sensed operating parameters for causing the intake means of a selected subset of the combustion chambers to be actuated in response to each movement of the piston from the top dead center position to the bottom dead center position, thereby permitting the flow of air into the combustion chambers, and the exhaust means of the selected subset of the combustion chambers to be actuated in response to each movement of the piston from the bottom dead center position to the top dead center position, thereby pumping the air from the combustion chamber into the turbine in the two-stroke pumping mode operation of the engine, increasing gaseous flow through the turbine and raising the boost pressure level.

2. The apparatus of claim 1 wherein the intake means includes a plurality of intake valves each operatively mounted in one of the intake ports, and intake valve support means for reciprocally supporting the intake valves.

3. The apparatus of claim 2 wherein the intake valve includes an intake valve stem, an intake valve head portion disposed at one end of the intake valve stem and an intake valve retainer disposed at an opposite end, and the intake valve support means includes an intake valve guide and encompassing the intake valve stem and an intake valve spring disposed about the intake valve stem.

4. The apparatus of claim 3 wherein the exhaust means includes a plurality of exhaust valves each operatively mounted in one of the exhaust ports and exhaust valve support means for reciprocally supporting the exhaust valves.

5. The apparatus of claim 4 wherein the exhaust valve includes an exhaust valve stem, an exhaust valve head portion disposed at one end of the exhaust valve stem and an exhaust valve retainer disposed at an opposite end, and exhaust valve support means includes an exhaust valve guide encompassing the exhaust valve stem and an exhaust valve spring disposed about the exhaust valve stem.

6. The apparatus of claim 1 wherein the means for actuating includes a piezoelectric motor.

7. An apparatus adapted for use with a turbocharged, four-stroke mode engine, the engine including a plurality of combustion chambers, an intake port and an exhaust port for each of the combustion chambers, a turbocharger having a compressor operatively connected to the intake port, a turbine operatively connected to the exhaust port, and an established boost pressure level, and a piston being reciprocally movable in each of the combustion chambers between a top dead center position and a bottom dead center position forming an intake stroke, movable between the bottom dead center position and the top dead center position forming a compression stroke, movable between a top dead center position and a bottom dead center position forming an expansion stroke, and movable between the bottom dead center position and the top dead center position forming an exhaust stroke, the apparatus comprising:

flow control means including an intake valve operatively mounted in each one of the intake ports to selectively pass air into the combustion chambers, and an exhaust valve operatively mounted in each one of the exhaust ports to selectively pass exhaust gas away from the combustion chambers during the exhaust stroke;

means for actuating each of the intake valves and the exhaust valves independently in response to a control signal; and electronic control means for causing the intake valve of a selected subset of the combustion chambers to be actuated in response to each movement of the piston from the top dead center position to the bottom dead center position, thereby permitting the flow of air into the combustion chambers, and the exhaust valve of the selected subset of the combustion chambers to be actuated in response to each movement of the piston from the bottom dead center position to the top dead center position, thereby pumping the air from the combustion chamber into the turbine in the two-stroke pumping mode operation of the engine, increasing gaseous flow through the turbine and raising the boost pressure level, the electronic control means acts in response to sensed operating parameters of the engine.

8. The apparatus of claim 7 wherein the engine includes a cylinder head having a top head surface and the flow control means further includes intake valve support means for reciprocally supporting the intake valves in the cylinder head and exhaust valve support means for reciprocally supporting the exhaust valves in the cylinder head.

9. The apparatus of claim 8 wherein the intake valve includes an intake valve stem, an intake valve head portion disposed at one end of the intake valve stem and an intake valve retainer disposed at an opposite end, and the intake valve support means includes an intake valve guide mounted in the cylinder head and encompassing the intake valve stem and an intake valve spring disposed about the intake valve stem and extending between the top head surface and the intake valve retainer.

10. The apparatus of claim 8 wherein the exhaust valve includes an exhaust valve stem, an exhaust valve head portion disposed at one end of the exhaust valve stem and an exhaust valve retainer disposed at an opposite end, and exhaust valve support means includes an exhaust valve guide mounted in the cylinder head and encompassing the exhaust valve stem and an exhaust valve spring disposed about the exhaust valve stem and extending between the the top head surface and the exhaust valve retainer.

11. The apparatus of claim 7 wherein the means for actuating includes a piezoelectric motor.

12. A method of operating an engine having a plurality of combustion chambers, an intake port and an exhaust port for each of the combustion chambers, a turbocharger having a compressor operatively connected to the intake port, a turbine operatively connected to the exhaust port, and an established boost pressure level, and a piston being reciprocally movable in each of the combustion chambers between a top dead center position and a bottom dead center position forming an intake stroke, movable between the bottom dead center position and the top dead center position forming a compression stroke, movable between a top dead center position and a bottom dead center position forming an expansion stroke, and movable between the bottom dead center position and the top dead center position forming an exhaust stroke, comprising the steps of:

(a) monitoring the operating condition of the engine;

(b) outputting a control signal to intake means an exhaust means;

(c) actuating each of the intake means and the exhaust means independently in response to a control signal;

(d) actuating the intake means of a selected subset of the combustion chambers in response to each movement of the piston from the top dead center position to the bottom dead center position, thereby permitting the flow of air into the combustion chamber; and (e) actuating the exhaust means of a selected subset of the combustion chambers in response to each movement of the piston from the bottom dead center position to the top dead center position, thereby pumping the air from the combustion chamber into the turbine in the two-stroke pumping mode operation of the engine, increasing gaseous flow through the turbine and raising the boost pressure level.

* * * * *